United States Patent [19]

Kim

[11] Patent Number: 4,555,954

[45] Date of Patent: Dec. 3, 1985

[54] METHOD AND APPARATUS FOR SENSING TACTILE FORCES

[75] Inventor: Byoung S. Kim, Hamilton Township, Mercer County, N.J.

[73] Assignee: AT&T Technologies, Inc., Berkeley Heights, N.J.

[21] Appl. No.: 684,683

[22] Filed: Dec. 21, 1984

[51] Int. Cl.[4] .......................... G01L 5/16; H01C 10/10
[52] U.S. Cl. .................................. 73/862.04; 338/47; 338/99; 901/33
[58] Field of Search ............ 73/862.04, 862.68, 432 T, 73/172; 338/47, 99, 114; 178/18; 340/365 A; 200/86 R

[56] References Cited

U.S. PATENT DOCUMENTS

| | | | |
|---|---|---|---|
| 3,308,253 | 3/1967 | Krakinowski | 178/18 X |
| 3,600,528 | 8/1971 | Leposavic | 340/365 A X |
| 3,617,666 | 11/1971 | Braue | 340/365 A X |
| 4,471,369 | 9/1984 | Anthony et al. | 357/26 |
| 4,492,949 | 1/1985 | Peterson et al. | 338/114 |
| 4,493,219 | 1/1985 | Sharp et al. | 338/99 X |
| 4,503,416 | 3/1985 | Kim | 338/99 |

FOREIGN PATENT DOCUMENTS

| | | |
|---|---|---|
| 54-1568 | 8/1979 | Japan . |
| 844267 | 7/1981 | U.S.S.R. . |
| 867646 | 9/1981 | U.S.S.R. . |

OTHER PUBLICATIONS

IBM Technical Disclosure Bulletin, vol. 19, No. 2, Jul. 1976, pp. 699–702, "High Density Tactile Sensor with One Resistance Wire".

"A High-Resolution Imaging Touch Sensor" by W. Daniel Hillis, The International Journal of Robotics, vol. 2, Summer 1982 at pp. 33–34.

"Active Touch Sensing" by William Daniel Hillis, M.I.T. Artifical Intelligence Laboratory, A. I. Memo 629, Apr. 1981.

"A Robot with Optical Position Feedback", K. Asakawa et al. published by Fujitsu Laboratories (date unknown).

Primary Examiner—Charles A. Ruehl
Attorney, Agent, or Firm—R. B. Levy

[57] ABSTRACT

A tactile sensor (100) comprises a printed circuit board (102) having a plurality of spaced apart, electrically conductive foils (104) thereon, each coupled to a decoder (106) which selectively applies a voltage individually thereto. The foils are separated from each other by each of a plurality of upraised insulative portions (116) each comprised of a layer of photoresist material. An anisotropically electrically conductive rubber pad (107) having alternating electrically conductive and nonconductive strips (108, 110) overlies the substrate so that the conductive strips are supported in spaced relationship from the conductive foils by the upraised photoresist layers. Each conductive strip is coupled to a multiplexer (115). Upon the application of a force against the rubber sheet, the conductive strips are deformed into electrical contact with the conductive foils on the substrate. The location and magnitude of the applied force can be determined from the voltage produced at the output of the multiplexer as the decoder selectively impresses a voltage on each conductive foil.

7 Claims, 10 Drawing Figures

METHOD AND APPARATUS FOR SENSING TACTILE FORCES

TECHNICAL FIELD

This invention relates generally to a method for sensing tactile forces.

BACKGROUND OF THE INVENTION

One of the difficulties in applying robots on a widespread basis for assembly operations has been the lack of an effective sensor for sensing the magnitude of, and the location at which, tactile forces are applied to a part by a robot gripper. Sensing the magnitude of the applied force is crucial if crushing of the part by the gripper is to be avoided. Knowing the location at which the force is applied by the gripper aids in determining the shape and orientation of the gripped part, thereby facilitating assembly operations.

Current research efforts have led to the development of an advanced tactile sensor comprised of a plurality of "taxcels" or individual cells arranged in a matrix array for sensing tactile forces. An example of such a sensor is described by W. D. Hillis in his article entitled "High Resolution Imaging Touch Sensors" published in the *International Journal of Robotics Research*, Vol. 1, No. 2, Pages 33-34 (1982) incorporated by reference herein. The sensor described in the Hillis article comprises a printed circuit board having a plurality of parallel, spaced apart, electrically conductive members or foils thereon. A sheet of anisotropically conductive rubber, comprised of alternating electrically conductive and nonconductive strips arranged at right angles to the conductive foils, overlies the printed circuit board. A sheet of nylon mesh having openings therethrough is interposed between the circuit board and the rubber sheet to separate the conductive foils from the conductive rubber strips.

When force is applied against the rubber sheet, one or more of the conductive strips deforms through the perforations in the mesh and makes electrical contact with one or more of the conductive foils on the printed circuit board. The location of the crossing point or area of contact between the conductive strip and the conductive foil on the circuit board is indicative of the location at which the force is applied to the rubber sheet. The size of each area of contact varies in accordance with how great the applied force is and thus becomes a measure of the magnitude of the applied force.

In the Hillis sensor the openings through the mesh separating the rubber sheet from the circuit board are not uniform. The nonuniformity in the size and spacing of the perforations in the mesh introduces a certain randomness in the size and location of the areas of contact between the conductive strips and the conductive foils when the conductive strips are deformed in response to the application of force against the rubber sheet. As a consequence, the size and location of each area of contact no longer become an accurate measure of the magnitude, and location, respectively, of the applied force.

Also, in the Hillis sensor, the exposed surface of the rubber sheet (which is referred to as the sensory surface) undulates, that is to say, becomes wavy when the ends of the conductive strips are wrapped about the printed circuit board to make electrical contact with metallized regions on a second circuit board positioned therebeneath. The waviness in the sensory surface of the rubber sheet makes it difficult to obtain a uniform connection between the conductive strips and the conductive foils which may affect the area of contact therebetween, and hence the measurement of the magnitude of the applied force.

Accordingly, there is a need to provide a reliable technique for sensing tactile forces.

SUMMARY OF THE INVENTION

A method for reliably sensing tactile forces, which is not subject to the foregoing disadvantages, comprises the steps of: deforming an elastomeric sheet, having alternating electrically conductive and nonconductive strips, by applying a force thereagainst to urge the conductive strips into contact with electrically conductive foils arranged on a substrate, the foils separated by upraised, insulative regions on the substrate which support the conductive strips; and sensing the size and location of each area of contact between each electrically conductive strip and each electrically conductive foil to determine the magnitude of, and the location of, the force is applied.

In practice, each of the upraised, insulative portions on the substrate comprises a layer of photoresist material of a height greater than that of the adjacent electrically conductive foils. The photoresist provides a much more reliable insulator than the nylon mesh of the prior art tactile sensor because the photoresist layers can be made of a uniform height, length and width and can be precisely spaced apart. In this way, variation in the size and location of the areas of contact between the electrically conductive strips of the rubber sheet and the underlying conductive foils on the circuit board, which, in the prior art sensor occur because of the variation in the size and spacing of the openings in the mesh, can be eliminated, yielding a more accurate measurement of the magnitude and the location of the applied force.

DETAILED DESCRIPTION

Figure 1:
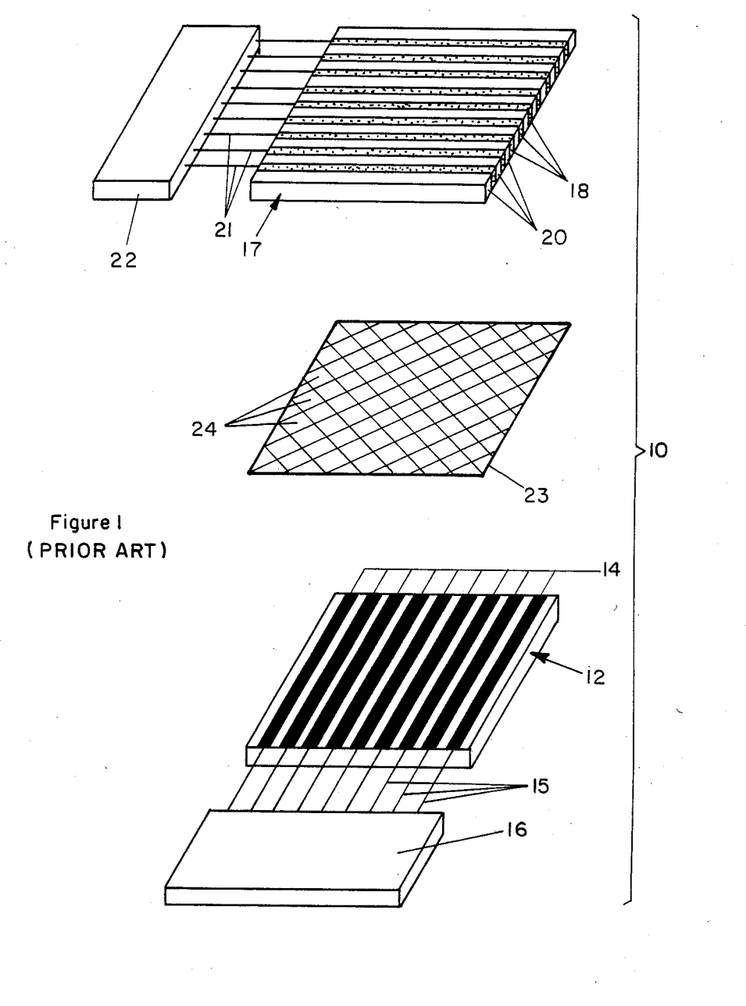
FIG. 1 is an exploded perspective view of a tactile sensor in accordance with the prior art.

FIG. 1 is an exploded perspective view of a tactile sensor 10 according to the prior art. The sensor 10 comprises a printed circuit board 12 having a plurality of parallel, spaced apart, electrically conductive strips or foils 14—14 thereon. Each foil 14 is connected to a separate one of a set of input lines 15—15 of a decoder 16.

Overlying the circuit board 12 is an anisotropically conductive elastomeric sheet 17 comprised of silicone rubber or the like. The sheet 17 comprises alternating electrically conductive and nonconductive parallel strips 18—18 and 20—20, respectively, each at right angles to the conductive foils 14—14 on the circuit board 12. Each of the electrically conductive strips 18—18 is connected to a separate one of a set of input lines 21—21 of a multiplexer 22.

An insulative mesh 23, having openings 24—24 therethrough, is interposed between the rubber sheet 17 and the printed circuit board 12 to separate the conductive strips 18—18 from the conductive foils 14—14. Typically, the mesh 23 is formed of Nylon material of the type used to fabricate ladies' stockings.

Figure 2:
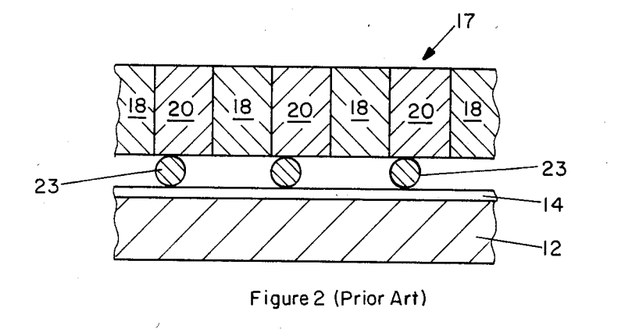
FIG. 2 is a cross-sectional view of the sensor of FIG. 1 showing the condition of the sensor when no force is applied.

FIG. 2 is a cross-sectional view of the sensor 10 showing the condition thereof in the absence of any force applied to the rubber sheet 17. Each conductive strip 18 is separated from, and is held out of electrical contact with, each conductive foil 14 on the circuit board 12 by the mesh 23.

Figure 3:
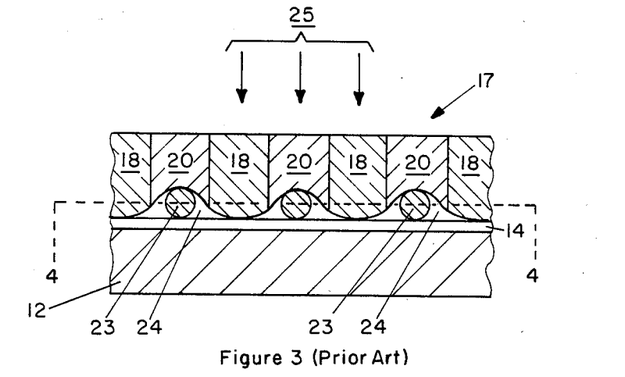
FIG. 3 shows the condition of the sensor of FIG. 2 when a light force is applied thereto.
Figure 4:
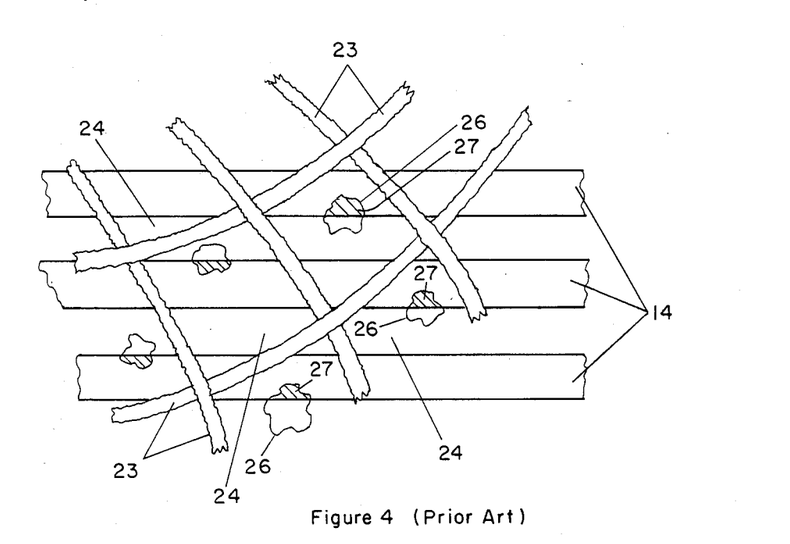
FIG. 4 is a cross-sectional view taken along the plane 4—4 of FIG. 3.

Referring now to FIG. 3, when a force, represented by a plurality of downwardly directed arrows 25—25, is applied against the rubber sheet 17, each conductive strip 18 is deformed through the openings 24—24 in the mesh 23 into intimate contact with each conductive foil 14 therebeneath. The portions of each strip 18 which deform through the perforations 24—24 in the mesh 23 are represented by the areas 26—26 in FIG. 4. The shaded portion 27 within each area 26 of FIG. 4 represents the area of contact between a separate one of the conductive strips 18 (see FIG. 3) and the underlying conductive foils 14—14. The location of each shaded region 27 is indicative of location at which force is applied to the sensor 10.

Figure 5:
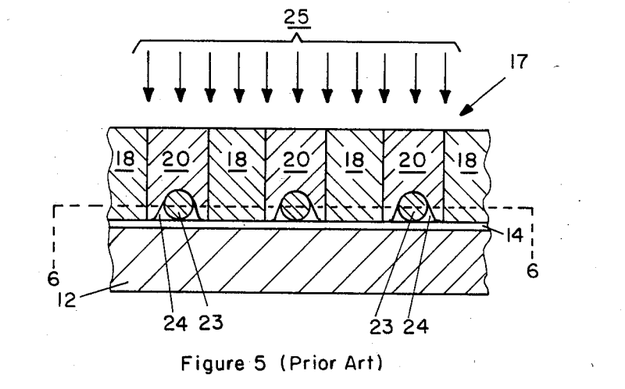
FIG. 5 shows the condition of the sensor of FIG. 2 when a heavy force is applied thereto.

Each of the strips 18—18 of FIG. 1 is elastic, so that the deformation of each strip is proportional to the magnitude of the force applied thereagainst. FIG. 5 shows the condition of the sensor 10 when a force (which is represented by a plurality of downwardly directed arrows 25—25), greater than that depicted in FIG. 3, is applied to the sensor. The greater the force applied to the sensor 10 of FIG. 5, the greater the deformation of each strip 18 through the perforations 24—24 of the mesh 23, as compared with the deformation of each strip depicted in FIG. 3.

Figure 6:
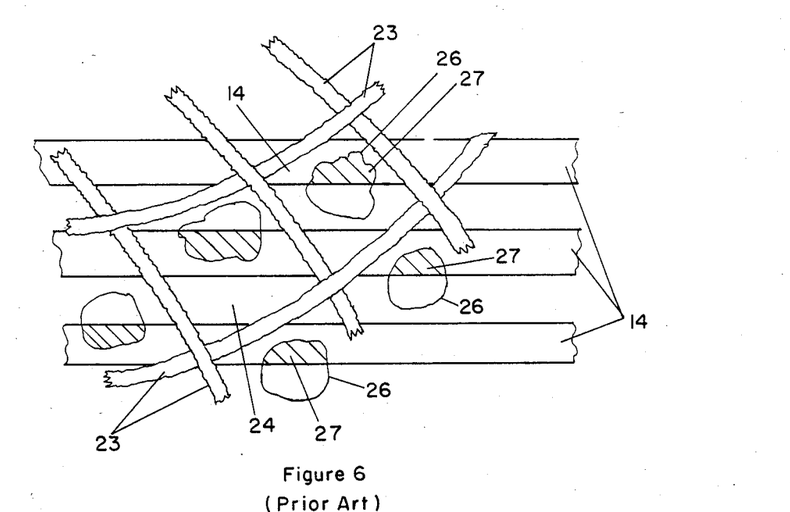
FIG. 6 is a cross-sectional view taken along the plane 6—6 of FIG. 5.

The portion(s) of each strip 18 (shown in FIG. 5) that deform through the perforations 24—24 in the mesh 23 are represented by areas 26—26 in FIG. 6. The shaded portion 27 of each area 26 represents the area of contact between a separate one of the strips 18 (see FIG. 5) and the underlying foil 14. As compared to each shaded portion 27 of FIG. 4, each shaded portion 27 of FIG. 6 is larger in area, as would be expected when a larger force applied to the sensor 10.

As illustrated in FIGS. 4 and 6, the size of and the spacing between the perforations 24—24 in the mesh 23 are not uniform. The nonuniformity of the size of and spacing of the perforations 24 causes the size and location of the shaded regions 27—27, which represent the areas of contact between the conductive strips 18 (see FIGS. 3 and 5) and the conductive foils 14—14 to vary. Any variation in the size and location of the areas of contact between each strip 18 and the underlying foils 14—14 reduces the accuracy of the sensor 10.

Figure 7:
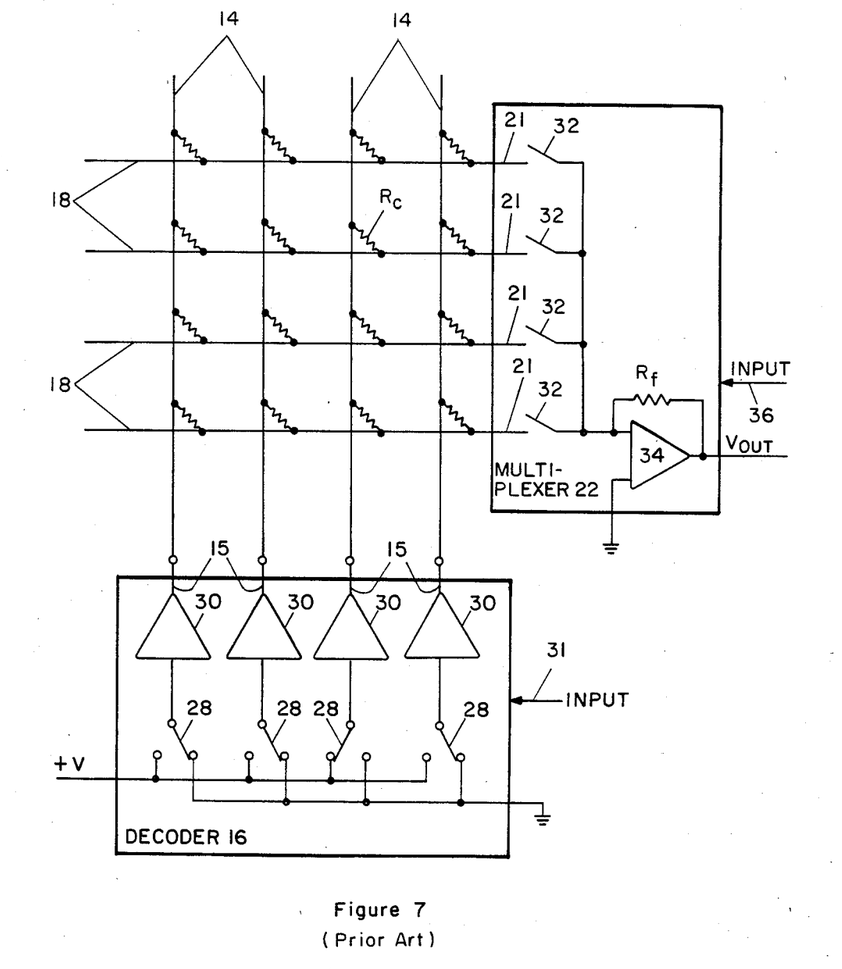
FIG. 7 is an electrical schematic representation of the sensor of the prior art.

FIG. 7 illustrates an electrical schematic representation of the prior art sensor 10. The decoder 16 of the sensor 10 is represented as a plurality of switches 28—28, each connected to an input of a separate one of a plurality of amplifiers 30—30. Each amplifier 30 has its output connected to a separate one of the output lines 15—15 of the decoder 16. The switches 28—28 are each actuated in accordance with the state of a digital signal supplied to control input 31 of the decoder 16 to connect the input of a separate one of the amplifiers 30—30 to either the positive terminal +V of a voltage source (not shown) or to circuit ground. In practice, a control circuit (not shown) supplies the input 31 of the decoder 16 with a sequence of digital signals, causing the swtiches 28—28 to sequentially connect the terminal +V of the power supply to the input of each of the amplifiers 30—30, causing the amplifiers to impress a voltage sequentially on each of the foils 14—14.

The multiplexer 22 is represented as a plurality of switches 32—32, each coupling a separate one of the lines 21—21 of the multiplexer to a first input of a differential amplifier 34 which has a second input coupled to circuit ground. The first input of the amplifier 34 is coupled to its output by a feedback resistor $R_f$. Each of the switches 32—32 is actuated in accordance with the state of a digital signal supplied to control input 36 of the multiplexer 22. The control circuit, which actuates switches 30—30 of the decoder 16, also supplies the control input 36 of the multiplexer 22 with a sequence of digital signals to actuate the switches 28—28 in sequence. In practice, each switch 32 remains actuated while the switches 30—30 are actuated in sequence.

The electrical resistance present between each conductive strip 18 and each foil 14 is represented as $R_c$ and varies inversely to the size of the area of contact between the strip and the foil (represented by the shaded regions 27 in FIGS. 4 and 6). Since the electrical resistance $R_c$ is typically much larger than the linear resistance of the strip 18, the value of $R_c$ can be given by $$R_c = R_f V / V_{out}$$

where V is the magnitude of the voltage input to the amplifier 30 connected to the foil 14 in contact with the strip, and $V_{out}$ is the magnitude of the output voltage of the amplifier 34. Since V and $R_f$ are usually fixed, the larger the magnitude of $V_{out}$, the smaller the value of $R_c$, and hence the larger the force applied to deform the sheet 17 (see FIG. 1). From a knowledge of the magnitude $V_{out}$ of the output voltage of the amplifier 34 upon the actuation of each of the switches 32, as each of the switches 28—28 is sequentially actuated, the magnitude and location of the applied force can be determined.

Figure 8:
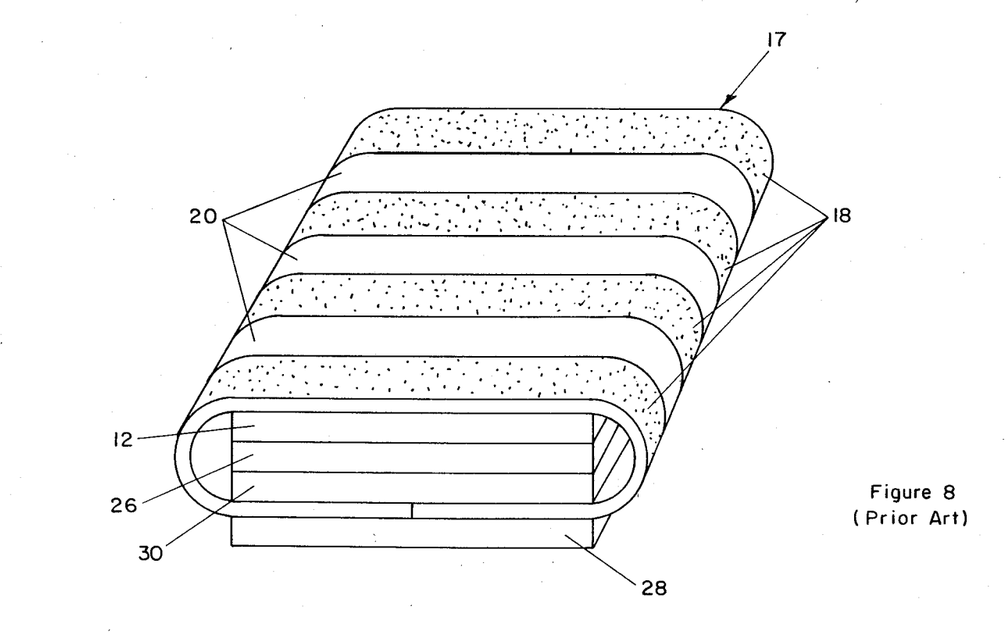
FIG. 8 is a perspective view of a sensor according to the prior art illustrating how an electrical connection is typically made to each of the conductive strips of the rubber sheet.

FIG. 8 represents the usual manner in which an electrical connection is usually made to each of the conductive strips 18—18 of FIG. 1. In practice, the conductive strips 18—18 of the rubber sheet 17 are typically wrapped around the circuit board 12. A pair of clamping members 26 and 28 clamp an end of each strip 18 against a second printed circuit board 30 positioned below the circuit board 12. In this way, the end of each strip 18 is held mechanical and electrical contact with metallized regions (not shown) on the lower surface of the circuit board 30. Although not shown in FIG. 7, each of the metallized regions on the printed circuit board 30 is typically coupled to a separate one of the input lines 21—21 (see FIG. 1) of the multiplexer 22 (see FIG. 1).

Wrapping the conductive strips 18—18 of the sheet 17 around the printed circuit board 12 to make contact with the metallized regions of the printed circuit board 30 causes the exposed or sensory surface of the sheet 17 to undulate or become wavy. Any waviness in the sheet 17 makes it difficult to achieve a uniform connection between each conductive strip 18 and the underlying conductive foils 14—14 (see FIGS. 1-6). The inability to obtain a uniform connection between each conductive strip 18 and the conductive foils 14—14 also imparts a certain randomness in the size of the area of contact between the strips 18—18 and the foils 14—14 of FIG. 1, thereby degrading the accuracy of sensor 10.

Figure 9:
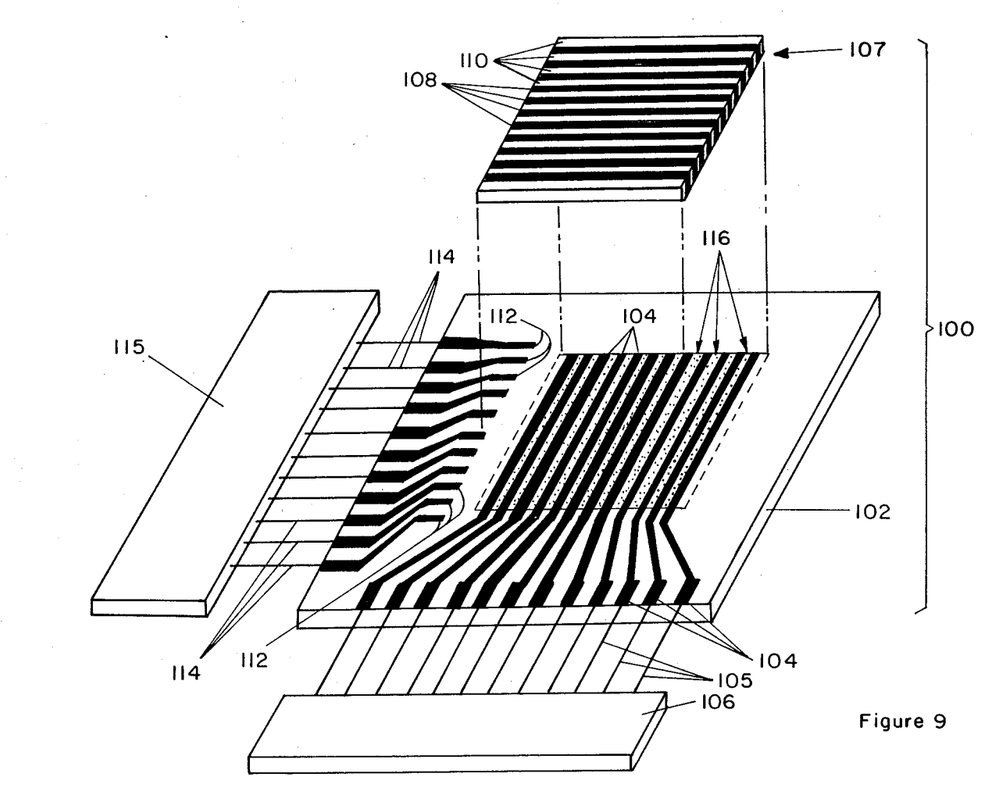
FIG. 9 is an exploded perspective view of the tactile sensor of the present invention.

FIG. 9 illustrates an exploded view of an improved tactile sensor 100 constructed in accordance with the teachings of the present invention. The sensor 100 comprises a printed circuit board 102 having a plurality of parallel, equally spaced apart, electrically conductive strips or foils 104—104 thereon. The conductive foils 104—104 are each electrically connected to a separate one of a set of outputs 105—105 of a decoder 106 identical to the decoder 16 of FIG. 1.

Overlying the circuit board 102 is an anisotropically conductive elastomeric sheet 107 comprised of a plurality of alternating electrically conductive and nonconductive parallel strips 108—108 and 110—110, respectively. Each of the strips 108—108 and 110—110 is at right angles to, and is positioned above the electrically conductive foils 104—104. Each conductive strip 108 of the rubber sheet 107 has one end thereof overlying a corresponding one of a set of electrically conductive connecting pads 112—112 on the circuit board 102. The conductive connecting pads 112—112 each have a layer of electrically conductive epoxy cement (not shown) thereon for bonding to a corresponding one of the overlying conductive strips 108—108 of the sheet 107 to establish an electrical and mechanical connection therebetween. The connecting pads 112—112 are each separately connected to a separate one of a set of inputs 114—114 of a multiplexer 115, identical to multiplexer 22 of FIG. 1.

Figure 10:
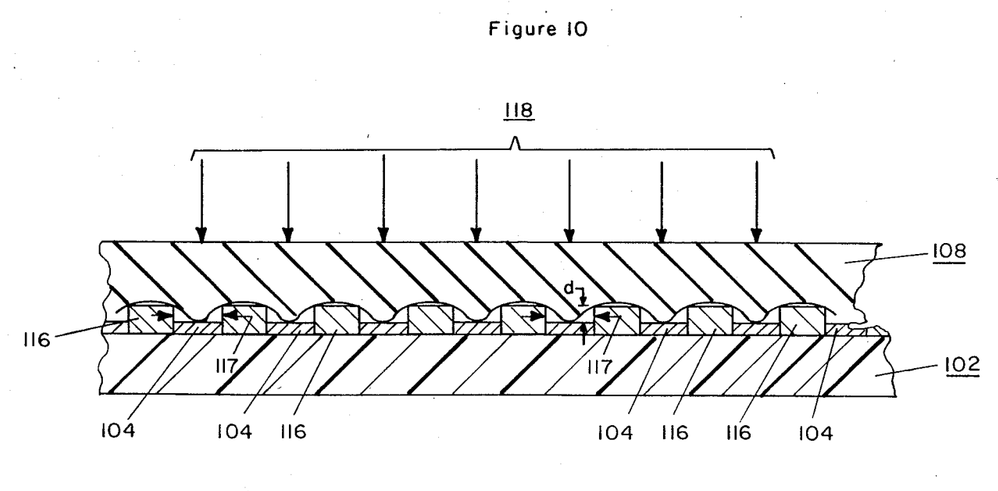
FIG. 10 is a cross-sectional view of the sensor of FIG. 9.

As best illustrated in FIG. 10 which is a cross-sectional view of the sensor 100 of FIG. 9, each conductive strip 108 is supported in spaced relationship above the electrically conductive foils 104—104 on the circuit board 102 by a plurality of parallel, equally spaced, upraised insulative regions 116—116 which are of uniform height, width and length. In practice, each upraised insulative region 116 is formed of a layer of cured photoresist deposited on the circuit board 102 between each of a pair of conductive foils 104—104. Instead of cured photoresist, the insulative regions 116—116 can be fabricated from an insulating, curable polymer whose height thickness and width can be controlled. Also, the insulative regions 116—116 could be made of solder masking material.

The presence of each of the photoresist layers 116—116 between each conductive strip 108 and the foils 104—104 creates a plurality of windows 117—117. Each window 117 is situated above a separate one of the conductive foils 104—104 and lies between a pair of photoresist layers 116—116. Each conductive strip 108 must be deformed a distance d through each window 117 in order to make contact with the foils 104—104 therebeneath. The distance d is equal to the difference between the height of each of a pair of spaced-apart photoresist layers 116—116 and the height of the conductive foil 104 therebetween. Increasing the thickness of the photoresist layers 116—116 while keeping the height of the conductive foils 104—104 constant, increases the distance d through which each strip 108 must be deformed. Since the amount of deformation of each conductive strip 108 is proportional to the magnitude of the force applied thereagainst, increasing the height of the photoresist layers 116—116 increases the amount of force required to deform the conductive strip into contact with the foils 104—104 therebeneath. By adjusting the thickness of the photoresist layers 116—116, the sensitivity of the sensor 100 can be varied.

When a force (represented by the downwardly directed array arrows 118) is applied to the rubber sheet 107 of FIG. 9, the conductive strips 108—108 are deformed through a separate one of the windows 117—117 of FIG. 10. If the deformation of each conductive strip 108 is greater than the distance d between the height of the photoresist layers 116—116 and the height of the conductive foils 104—104, then the strip makes contact with each of the conductive foils. The location and size of area of contact between each conductive strip 108 and each of the conductive foils 104—104 can be determined from the output voltage produced by multiplexer 115 as the decoder 106 selectively impresses a voltage individually on each of its output lines 105—105.

The instant sensor has been found to provide a more accurate measurement of the magnitude and location of the force applied thereto. Each of the windows 117—117, which defines the opening through which each of the conductive strips 108—108 deforms, has a uniform area, owing to uniform length and width of each of the photoresist layers 116—116. Moreover, since the photoresist layers 116—116 are spaced precisely apart, the windows 117—117 are precisely located above the conductive foils 104—104. Therefore, the size and location of the areas of contact between the conductive strips 108—108 and the foils 104—104 are not subject to any variations attributable to the size and location of the windows 117—117 leading to more accurate results.

Also, the sensor 100 of FIGS. 9 and 10 does not incur the disadvantage of a nonuniform sensory surface which is suffered by the prior art sensors. Each of the conductive strips 108—108 of the sensor 100 has an end electrically and mechanically bonded to the connecting pads 112—112 on the substrate 102. Thus, the conductive strips 108—108 remain substantially flat so that the problem of waviness which is suffered by the conductive strips of the prior art sensors is substantially avoided.

Further, the sensor 100 has the advantage that its sensitivity to force can be adjusted by varying the thickness of the photoresist layers 116—116. By varying the thickness of the photoresist layers 116—116, the force required to deform the conductive strips 108—108 into electrical contact with the conductive foils 104—104 can be adjusted.

It is to be understood that the various embodiments described herein are merely illustrative of the principles of the invention. Various modifications may be made thereto by persons skilled in the art which may embody the principles of the invention and fall within the spirit and scope thereof.

What is claimed is:

1. A method for sensing forces comprising the steps of:
    deforming an elastomeric sheet, having alternating electrically conductive and nonconductive strips, by applying a force thereagainst to urge the conductive strips into contact with each of a plurality of electrically conductive foils on a substrate underlying the elastomeric sheet, the electrically conductive foils being separated from each other by upraised, insulative regions on the substrate which support the conductive strips; and
    sensing the size and location of each area of contact between each conductive strip and each conductive foil on the substrate to determine the magnitude of, and the location of a force applied to the elastomeric sheet.

2. The method according to claim 1 wherein the upraised insulative regions supporting the conductive strips out of electrical contact with the conductive members on the substrate each comprise a layer of photoresist material deposited on the substrate.

3. The method according to claim 1 wherein the height of the upraised insulative regions is selected in accordance with the amount of force required to deform the strips into contact with the conductive foils.

4. The invention according to claim 3 wherein the substrate includes a plurality of electrically conductive connecting pads each located beneath one of the ends of each of said conductive strips of said sheet for mechanical and electrical bonding therewith.

5. A tactile sensor comprising:
    a substrate having electrically conductive foils on a major surface thereof each separated from an adjacent foil by each of a plurality of upraised insulative regions;
    a resilient sheet comprised of spaced apart, alternating electrically conductive and nonconductive strips supported in spaced relationship from the conductive foils by the upraised insulative regions on the substrate, said conductive strips being deformable in response to force applied thereagainst to make electrical contact with the conductive foils; and
    means for sensing the size and location of the areas of contact between the conductive strips and the conductive foils on the substrate to determine the magnitude of, and the location where, the force is applied.

6. The invention according to claim 5 wherein each upraised insulative region comprises a layer of photoresist material lying between each of a pair of electrically conductive foils.

7. The invention according to claim 6 wherein each layer of photoresist is of a predetermined height so that a predetermined force is required to deform the conductive strips into contact with the conductive foils.

* * * * *